United States Patent
Stransky

(10) Patent No.: US 7,986,781 B2
(45) Date of Patent: Jul. 26, 2011

(54) METHOD FOR CONTROLLING ACCESS TO ENCRYPTED DATA

(75) Inventor: Philippe Stransky, Cheseaux-sur-Lausanne (CH)

(73) Assignee: Nagravision S.A., Cheseaux-Sur-Lausanne (CH)

(*) Notice: Subject to any disclaimer, the term of this patent is extended or adjusted under 35 U.S.C. 154(b) by 851 days.

(21) Appl. No.: 11/994,487

(22) PCT Filed: Jul. 6, 2006

(86) PCT No.: PCT/EP2006/063989
§ 371 (c)(1),
(2), (4) Date: Jan. 2, 2008

(87) PCT Pub. No.: WO2007/006736
PCT Pub. Date: Jan. 18, 2007

(65) Prior Publication Data
US 2008/0192927 A1    Aug. 14, 2008

(30) Foreign Application Priority Data
Jul. 7, 2005 (EP) .................................. 05106186

(51) Int. Cl.
*H04L 9/00* (2006.01)
(52) U.S. Cl. .......... 380/42; 380/200; 380/211; 380/231; 380/239; 380/240; 380/242; 380/255; 713/400; 713/401; 726/2; 726/23; 726/27
(58) Field of Classification Search ............ 380/42
See application file for complete search history.

(56) References Cited

U.S. PATENT DOCUMENTS
4,369,332 A * 1/1983 Campbell, Jr. ............ 380/43
(Continued)

FOREIGN PATENT DOCUMENTS
EP    1447983 A1    8/2004
(Continued)

OTHER PUBLICATIONS

International Search Report, International Application No. PCT/EP2006/063989, Filing Date: Jul. 6, 2006.

*Primary Examiner* — John Follansbee
*Assistant Examiner* — Backhean Tiv
(74) *Attorney, Agent, or Firm* — DLA Piper LLP US

(57) ABSTRACT

The invention concerns a method for controlling access to encrypted data (CT) by control words (CW), said control words being received by a security module in control messages (ECM) and returned to a unit operating on the encrypted data. Said control messages (ECM) contain at least one first control word (CW1) and a second control word (CW2), said control words each allowing access to the encrypted data (CT) during a predetermined period called cryptoperiod (CP). Said method includes the following steps: sending said encrypted data to at least one operating unit; and sending control messages (ECM) to said control unit, such a control message (ECM) containing at least two specific control words (CW1, CW2) being sent to the operating unit after sending the data encrypted by said first control word (CW1) and before sending the data encrypted by said second control word (CW2). Said method is characterized in that the time shift between sending to the operating unit the data encrypted by said first control word (CW1) and sending the control message (ECM) containing said first control word (CW1) and said second control word (CW2) is more than 75% of the cryptoperiod.

4 Claims, 2 Drawing Sheets

U.S. PATENT DOCUMENTS

| | | | |
|---|---|---|---|
| 4,642,424 A * | 2/1987 | McNair | 380/262 |
| 4,965,804 A * | 10/1990 | Trbovich et al. | 713/153 |
| 5,029,206 A * | 7/1991 | Marino, Jr. et al. | 713/164 |
| 5,048,087 A * | 9/1991 | Trbovich et al. | 380/43 |
| 5,349,641 A | 9/1994 | Coutrot et al. | |
| 5,404,403 A * | 4/1995 | Bright et al. | 380/277 |
| 5,528,693 A * | 6/1996 | Leopold | 380/274 |
| 5,610,839 A * | 3/1997 | Karolak et al. | 455/450 |
| 5,937,066 A * | 8/1999 | Gennaro et al. | 380/286 |
| 6,324,286 B1 * | 11/2001 | Lai et al. | 380/29 |
| 6,868,407 B1 * | 3/2005 | Pierce | 705/60 |
| 6,898,285 B1 * | 5/2005 | Hutchings et al. | 380/200 |
| 6,954,866 B2 * | 10/2005 | Vergnes | 713/320 |
| 6,978,022 B2 * | 12/2005 | Okimoto et al. | 380/211 |
| 6,980,650 B2 * | 12/2005 | Wachtfogel et al. | 380/42 |
| 7,003,114 B1 * | 2/2006 | Mauro | 380/261 |
| 7,058,609 B2 * | 6/2006 | Moroney et al. | 705/59 |
| 7,069,439 B1 * | 6/2006 | Chen et al. | 713/172 |
| 7,120,696 B1 * | 10/2006 | Au et al. | 709/229 |
| 7,171,392 B2 * | 1/2007 | Brookner et al. | 705/401 |
| 7,379,548 B2 * | 5/2008 | Revital et al. | 380/240 |
| 7,400,728 B2 * | 7/2008 | Genevois | 380/210 |
| 7,474,749 B2 * | 1/2009 | Mauro | 380/255 |
| 7,486,793 B2 * | 2/2009 | Cochard et al. | 380/231 |
| 7,587,764 B2 * | 9/2009 | Cox | 726/23 |
| 7,647,641 B2 * | 1/2010 | Dubroeucq et al. | 726/27 |
| 7,661,011 B2 * | 2/2010 | Vergnes | 713/501 |
| 7,668,311 B2 * | 2/2010 | Kudelski et al. | 380/200 |
| 7,681,227 B2 * | 3/2010 | Zwart et al. | 726/2 |
| 7,711,120 B2 * | 5/2010 | Kimmel et al. | 380/279 |
| 7,715,565 B2 * | 5/2010 | Kimmel et al. | 380/281 |
| 7,739,501 B2 * | 6/2010 | Kimmel et al. | 713/168 |
| 7,769,177 B2 * | 8/2010 | Son et al. | 380/281 |
| 7,809,942 B2 * | 10/2010 | Baran et al. | 713/160 |
| 7,869,596 B2 * | 1/2011 | Abelard et al. | 380/210 |
| 7,912,219 B1 * | 3/2011 | Michener et al. | 380/239 |
| 2004/0215691 A1 | 10/2004 | Van De Ven et al. | |
| 2007/0223695 A1 * | 9/2007 | Beun et al. | 380/239 |
| 2008/0279379 A1 * | 11/2008 | Muijen | 380/228 |

FOREIGN PATENT DOCUMENTS

| | | |
|---|---|---|
| FR | 2631193 | 11/1989 |
| WO | 01/15448 A1 | 3/2001 |
| WO | WO 2004071091 A1 * | 6/2004 |
| WO | 2004/071091 A1 | 8/2004 |
| WO | WO 2004071091 A1 * | 8/2004 |

\* cited by examiner

METHOD FOR CONTROLLING ACCESS TO ENCRYPTED DATA

TECHNICAL FIELD

The present invention relates to a method for controlling access to data encrypted by control words CW, these control words being received by a security module in control messages and returned to a processing unit for encrypted data.

The present method applies in particular to the case of Pay-TV.

PRIOR ART

In a well-known method, in particular in the aforementioned field of Pay-TV, data is encrypted by a data supplier by means of encryption keys called control words. This data is transmitted to multimedia units of users or subscribers. Parallel to this, the control words are transmitted to these multimedia units in the form of a stream of control messages.

The multimedia units are generally made up of a processing unit that, in the case of Pay-TV, is a decoder receiving the aforementioned stream and of a security module responsible for the cryptographic operations related to the use of these streams.

As is well known to those skilled in the art, this type of security module can essentially be produced according to four distinct forms. One of these is a microprocessor card, a smart card, or more generally an electronic module (in the form of a key, of badge, . . . ). This type of module is generally removable and can be connected to the decoder. The form with electrical contacts is the most widely used, however the use of a contactless connection is not excluded, for example of the ISO 14443 type.

A second known form is that of an integrated circuit box placed, generally in an definitive and irremovable way, in the decoder box one variant is made up of a circuit mounted on a base or connector such as a SIM module connector.

In a third form, the security module is integrated into an integrated circuit box also having another function, for example in a descrambling module of a decoder or the microprocessor of a decoder.

In a fourth embodiment, the security module is not materially produced, but rather its function is only implemented in the form of software. Given that in the four cases, although the security level differs, the function is identical, it is possible to talk about a security module regardless of the way in which it functions or the form that this module may take.

When a multimedia unit has received the stream containing the control words, first it is verified if the user has available the rights to decrypt the specific data. If this is the case, the control messages are decrypted in order to extract the control words. These control words are in turn used to decrypt the data.

As is also known, each control word generally allows a small part of the data transmitted to be decrypted. Typically, one control word allows 10 seconds of a Pay-TV event to be decrypted. After this time duration, called a cryptoperiod, the control word is changed for security reasons.

One possible way to enjoy access to encrypted data without being authorised consists in using a genuine multimedia unit with a real security module and in distributing the control words to a set of decoders. This can be done by means of a server or separating device known as a "splitter". Therefore, the amounts related to the acquisition of access rights to encrypted data are paid by a single multimedia unit while the events are accessible from several multimedia units.

The invention described in patent application US 2004/0215691 intends to prevent a security module from being shared by several users. In order to realise this aim, each time a control message is received by a multimedia unit, this unit or the security module that is associated to it determines the channel to which this control message is related. The channel identifiers are memorised with a time information. The messages are compared in order to determine if they are related to different channels or the same channel. If they are related to different channels, a counter is incremented by a certain value. If the control messages are related to the same channel, the counter is decremented. If the counter reaches an established threshold value, this means that many channel changes have occurred and the decrypting of the control words is stopped.

For this process it is necessary to have an identifier of the channel concerned for each control message at your disposal. In certain configurations, this is not the case. By using the control messages as defined in particular in the Eurocrypt No EN 50094 standard of December 1992, it is possible to identify a class of channels rather than each channel. In this case, it is impossible, with the invention described above, to block the use of several multimedia units that only use one security module and a splitter.

The international patent application published with the number WO 01/15448 describes a Pay-TV system and more precisely a video on demand system. In this system, the data is encrypted by means of control words. These control words are only sent to users within a predefined time period during which the user must acquire them if s/he wishes to be able to access the content. This process limits the risk of a fraudulent user receiving the control words illegally and thus accessing the content.

This process is not however applicable to a conventional Pay-TV system in which a user can change channel. In fact, in the case of a channel change, this user would be obliged to wait to receive a control message corresponding to the new channel before being able access the content.

The publication WO 2004/071091 describes an invention whose aim is to maximise the scrolling speed authorised in "fast forward" or "fast rewind" mode. This aim is thus completely different from the aim of the invention that is the object of the present application. In the publication WO 2004/071091, the optimisation of the scrolling speed is obtained by shifting the changing of the control word in relation to the data stream of a value corresponding to approximately half a cryptoperiod. This value of half the cryptoperiod is the ideal value to allow the aim of the invention to be achieved, since it allows the optimisation of the speed both at the time of scrolling forwards as well as scrolling backwards. The greater the distance from this value, the less useful the advantage of shifting the data stream with the change of control word will be.

As is well-known, the control messages are repeated according to very short time intervals, for example 50 ms. The aim of this is to make the control word necessary for access to the contents rapidly available when zapping. When a multimedia unit has received a control message, it filters the identical messages in such a way that the latter are only transmitted to the security module once. In the following description, it is implied that when control messages ECM are mentioned we are referring to different messages, since identical messages are not used.

A difficulty arises when the control messages contain more than one control word. In practice, it is normal to send two control words per control message. The advantage of this lies in the fact that while one of the control words is used, the other is decrypted and memorised. This embodiment makes it possible to use safer decrypting algorithms, which are longer to decrypt.

In such a case, it is possible for a fraudulent user to use only one control message of two, then to transmit the unused message to another decoder or processing device. In this way, each decoder receives all the control words that it requires. Therefore, several processing units can allow access to encrypted content while in theory only one subscriber has the rights.

This type of fraud is particularly difficult to detect since it is impossible, without using a channel identifier, to distinguish a normal use of all control messages by only one decoder and fraudulent use by two different decoders of one control message of two.

SUMMARY OF THE INVENTION

This invention proposes to solve this problem and thus to prevent access to an encrypted content during the fraudulent use of two decoders with only one security module.

The solution of the invention also makes it possible to prevent, at least partially, access to the encrypted content by fraudulent users only using one control message of two and whose other control message is transmitted to another decoder.

The aim of the invention is achieved by a method for controlling access to data encrypted by control words, these control words being received by a security module in control messages and returned to a processing unit for encrypted data, said control messages containing at least a first control word and a second control word, these control words each allowing access to encrypted data during a determined time duration called a cryptoperiod, this method including the steps of:

sending said encrypted data to at least one processing unit; and sending the control messages to said processing unit, this type of control message containing at least two determined control words being sent to the processing unit after the sending of the data encrypted by said first control word and before the sending of the data encrypted by said second control word;

this method being characterised in that the time shifting between the sending to the processing unit of data encrypted by said first control word and the sending of the control message containing said first control word and said second control word is greater than 75% of the cryptoperiod.

Generally, the method according to this invention uses control messages containing two control words. However, the user only using one control message of two will not be able to access the entirety of the encrypted content. Two users sharing a splitter and one security module will each be able to access only a part of the audio/video content.

BRIEF DESCRIPTION OF THE DRAWINGS

This invention and its advantages will be better understood with reference to the enclosed Figures and to the detailed description of a particular embodiment given as a non-limitative example, in which.

METHODS FOR CARRYING OUT THE INVENTION

Figure 1:
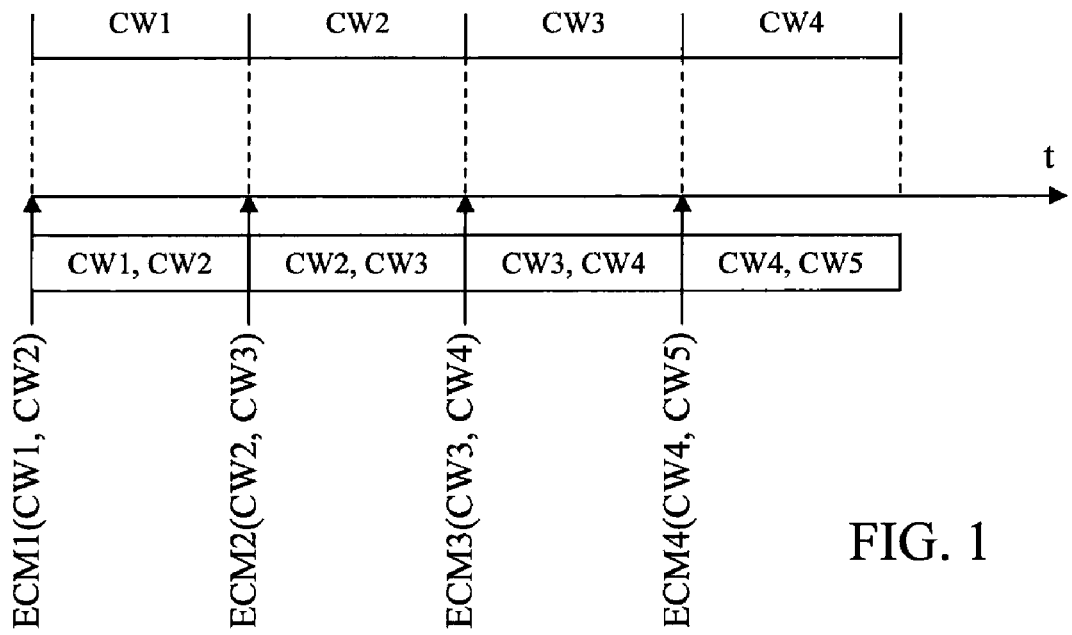
FIG. 1 shows an embodiment according to the prior art, in which a data stream and a control message stream are used conventionally.

FIG. 1 schematically shows a stream of audio/video content CT as well as a stream of control messages ECM containing control words CW, according to time, according to the prior art. In this Figure, the audio/video content is encrypted with control words with the references CW1, CW2, . . . these control words having a limited "life time" called a cryptoperiod, namely each control word allows access to the encrypted content during a time duration corresponding to this cryptoperiod. The latter can for example be 10 seconds. In the example illustrated, the first control message ECM1 contains two control words CW1 and CW2. At the same time as the diffusion of this first message, the content CT is encrypted with the first control word CW1. As soon as the control message ECM1 is decrypted and the control word CW1 is returned to the security module of the decoder, the content can be decrypted and used. During this time, the second control word CW2 is memorised. It can be used as soon as necessary, that is to say when the data to be decrypted is that which has been encrypted by this control word CW2.

Figure 2:
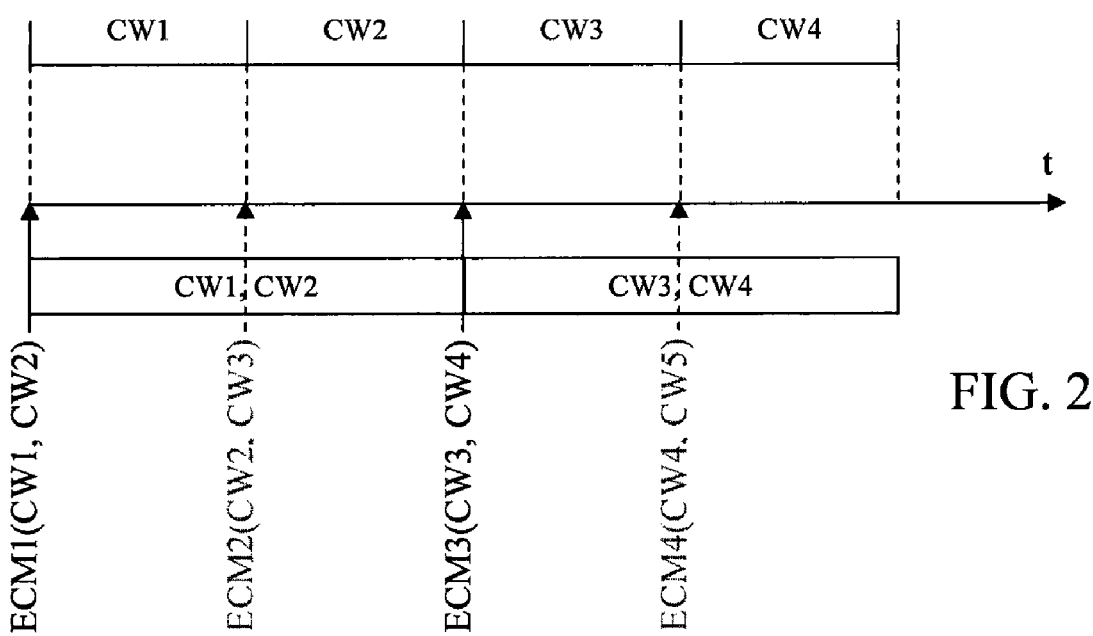
FIG. 2 shows the embodiment in FIG. 1, in which the data stream and the control message stream are used fraudulently.

FIG. 2 illustrates a fraudulent use of the process represented in FIG. 1. In this use, the first user receives the first control message ECM1 and extracts the control words CW1 and CW2 from it. Before receiving the second control message ECM2, the latter is filtered so it cannot be used. When the content must be decrypted with the control word CW2, the latter is available since it has been sent in the first control message ECM1.

The control message ECM2 can be used to supply a second decoder. In order to detect a fraudulent use, it is possible to carry out a calculation of the number of control messages ECM decrypted during each cryptoperiod. This allows action to be taken when a number of control messages that is too large is decrypted for each cryptoperiod. However, in the case of the invention, a test on the number of control messages per cryptoperiod will not allow a fraudulent use to be located and prevented, since this number corresponds exactly to a number of messages decrypted by only one security module being used normally.

Figure 3:
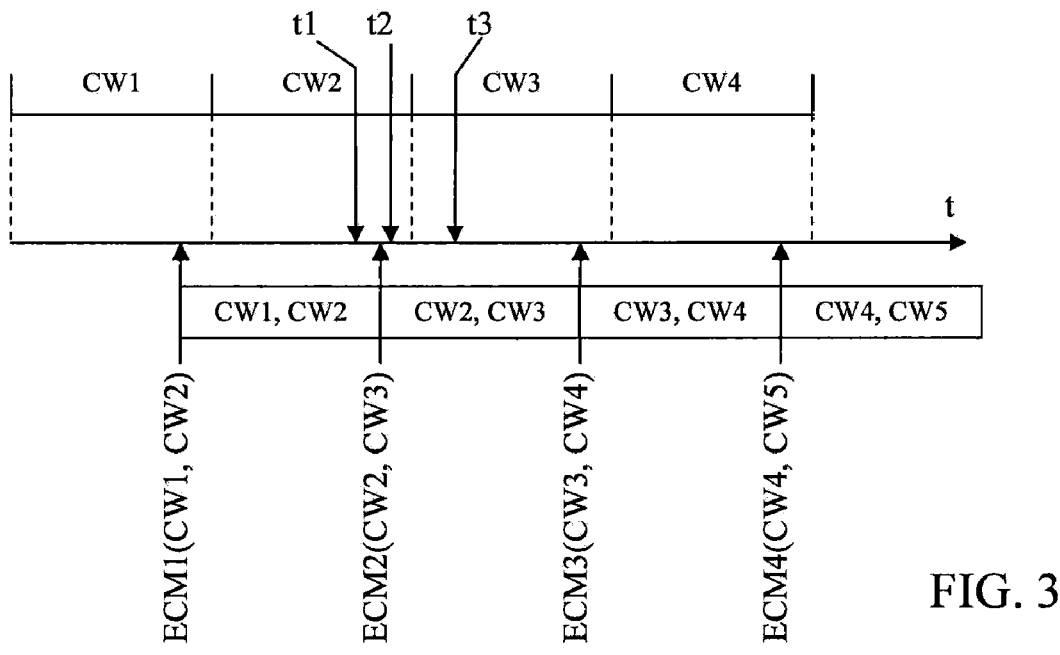
FIG. 3 shows an embodiment according to the invention, in which the data stream and the control message stream are used conventionally.

FIG. 3 schematically represents the method of the invention. In this method, the encrypted data stream CT is shifted in relation to the stream of control messages ECM. The following description concerns the normal use of one single multimedia unit with only one security module.

As an example, we will consider the case in which a user activates his/her multimedia unit or hits a determined channel at the time indicated by t1 in FIG. 3. At this moment, the content CT must be decrypted by the control word CW2. Also at this moment, the first control message ECM1 is broadcast. This control message ECM1 contains the control words CW1 and CW2. The content can thus be decrypted thanks to the control word CW2.

If the user activates his/her multimedia unit or hits a determined channel at the time indicated by t2, the control word CW2 will also be necessary to decode the content. At this moment, the second control message ECM2 is broadcast.

This contains the control words CW2 and CW3. The content CT can thus be decrypted thanks to the control word CW2.

If the user activates his/her multimedia unit or hits a determined channel at the time indicated by t3, the development of the process will be similar to the development explained for the case where the activation time is t1. The control word CW2 originating from the control message ECM2 can be used to access the content.

As can be seen, in conventional usage, the encrypted content can be accessed regardless of the moment when a user activates his/her multimedia unit or changes channel.

Figure 4:
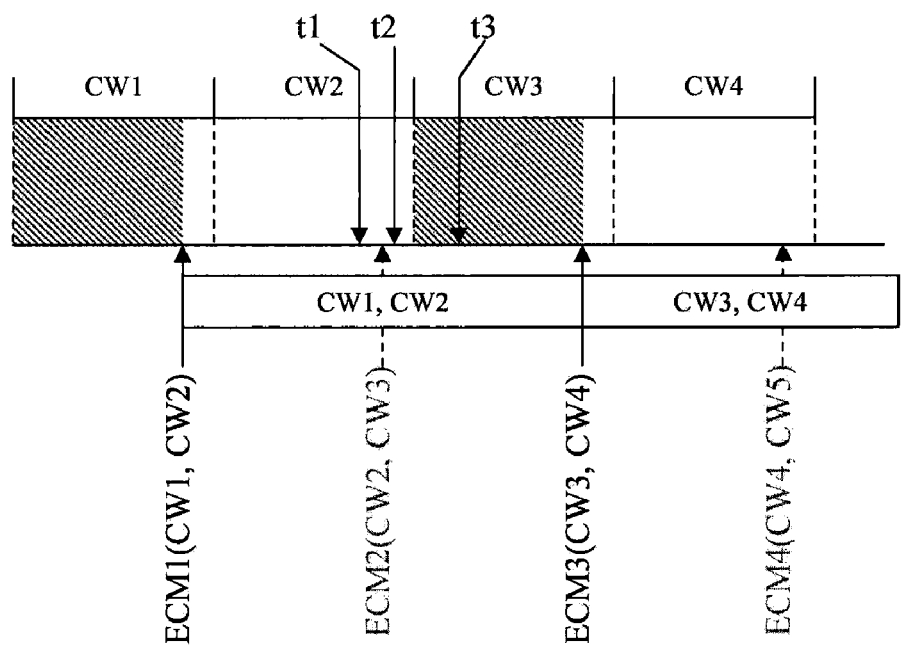
FIG. 4 shows the embodiment of FIG. 3, in which the data stream and the control message stream are used fraudulently.

FIG. 4 illustrates a fraudulent use of two multimedia units with the method of the invention. According to this use, each decoder only uses one control message of two. Imagine that one of the decoders uses the first control message ECM1, containing the control words CW1 and CW2. If the user activates his/her multimedia unit or hits a channel concerned at the time t1, everything takes place as in the example illustrated in FIG. 3, namely the control word CW2 necessary for the decryption of the content is available as it was integrated into the control message ECM1. The content is thus accessible.

If the user activates his/her multimedia unit at the time t2, it will need the control word CW2 to be able to access the content CT. Given that the latter has been sent in the first control message ECM1, it is available and the content can be decrypted.

When the user activates his/her multimedia unit at the moment t3, it will need the control word CW3 to be able to access the content. This control word is sent once in the second control message ECM2 and once in the third control message ECM3. In the hypothesis of a fraudulent use as described previously, the second control message ECM2 has not been used by this decoder, but has been transmitted to another decoder. The control words that it contains are thus not available for the decoder concerned. Since there is a shift between the stream of data and of control messages, the third control message ECM3 is not available at the moment t3. As a result, the content cannot be decrypted during the entire period between the moment where the third control word CW3 is necessary and the sending of the third control message ECM3, In practice, for a honest user to have access to the totality of the content, it is necessary for the shift between the data stream CT and the stream of control messages ECM to be lower than a cryptoperiod. For a fraudulent user to be penalised to the maximum, the shift must be as large as possible. A shift slightly lower than a cryptoperiod is generally chosen. Preferably, a shift will be chosen in such a way that this shift plus the time for processing said control message by the security module and for returning the control word to the processing device will be lower than the cryptoperiod.

As an example, it is possible to provide a cryptoperiod of 5 seconds for example with a shift of 4 seconds between the two streams. The result is that in the case of the use of only one security module supplying two decoders, each decoder will be subjected to a significant period during which it will not have access to the encrypted content.

The invention claimed is:

1. A method for controlling access to data encrypted by control words, said control words being received by a security module in control messages and returned to a processing unit for accessing encrypted data, said control messages containing at least a first control word and a second control word, said first and second control words each allowing access to data encrypted by said control words during a respective cryptoperiod, the method comprising the steps of:

sending said encrypted data to at least one processing unit; and sending the control messages to said processing unit, each of the control messages being sent to the processing unit after the sending of the data encrypted by said first control word and before the sending of the data encrypted by said second control word;

wherein the time shifting between the sending to the processing unit of data encrypted by said first control word and the sending of the control message containing said first control word and said second control word is greater than 75% of the cryptoperiod, said time shifting being determined in such a way as to prevent the processing unit decrypting the encrypted data by using only one control message of two consecutive control messages.

2. The method for controlling access according to claim 1, wherein the time shifting between the sending to the processing unit of data encrypted by said first control word and the sending of the control message containing said first control word and said second control word is lower than 100% of the cryptoperiod.

3. The method for controlling access according to claim 1, wherein the time shifting between the sending to the processing unit of data encrypted by said first control word and the sending of the control message containing said first control word and said second control word is lower than 100% of the cryptoperiod minus the time necessary for processing said control message by the security module and for returning the control word to the processing device.

4. The method for controlling access according to claim 1, wherein the data encrypted by the control words is of the MPEG type.

* * * * *